UNITED STATES PATENT OFFICE.

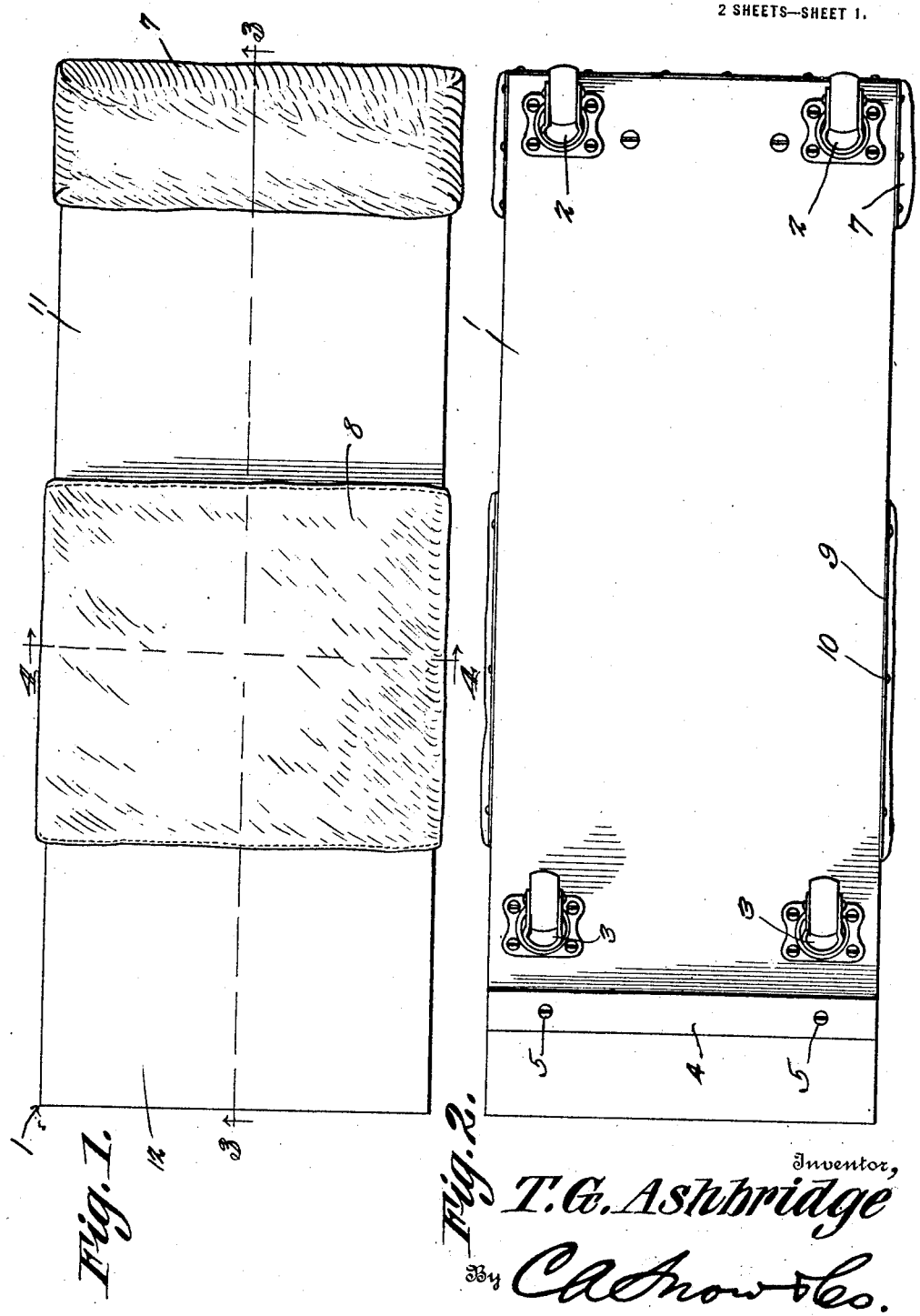

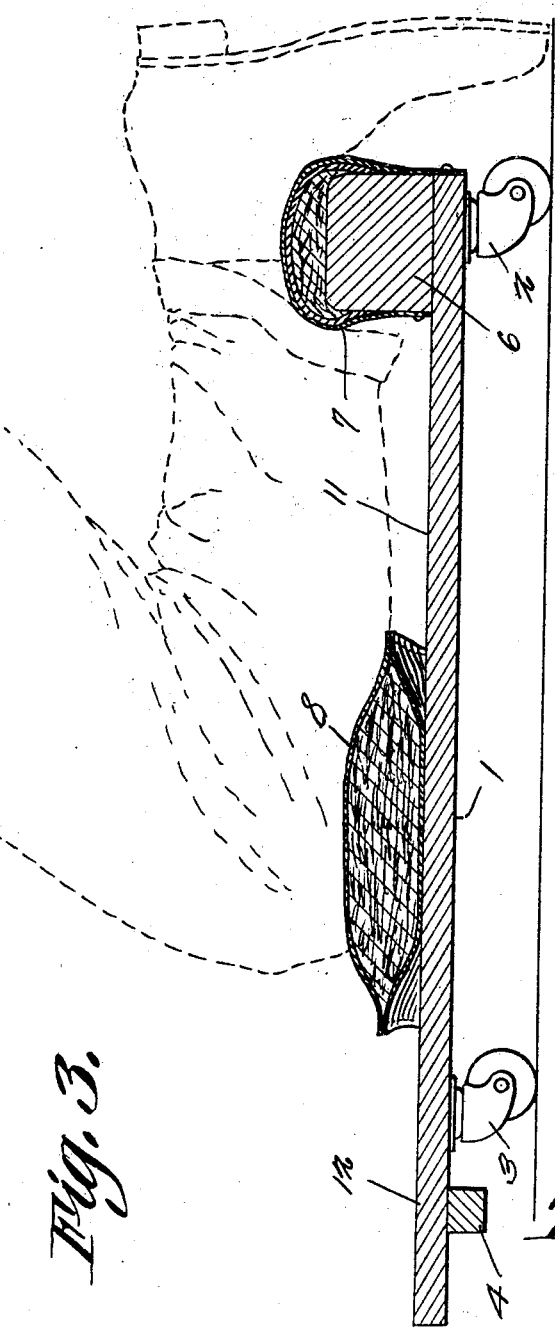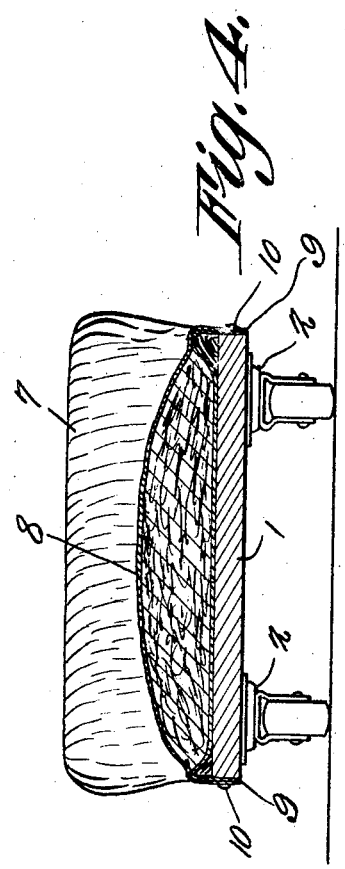

THOMAS G. ASHBRIDGE, OF PHILADELPHIA, PENNSYLVANIA.

KNEELING-TRUCK.

1,382,883.　　　　Specification of Letters Patent.　Patented June 28, 1921.

Application filed January 4, 1921. Serial No. 434,999.

*To all whom it may concern:*

Be it known that I, THOMAS G. ASHBRIDGE, a citizen of the United States, residing at Philadelphia, in the county of Philadelphia and State of Pennsylvania, have invented a new and useful Kneeling-Truck, of which the following is a specification.

This invention aims to provide a truck on which a workman may kneel, the construction being such that the person will be afforded no discomfort, and it being possible to move the truck readily from place to place as the work advances.

The invention aims to improve generally and to enhance the utility of trucks of the sort used by scrub women, painters, floor cleaners and others, whose calling demands a kneeling posture.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in top plan, a device constructed in accordance with the invention; Fig. 2 is a bottom plan; Fig. 3 is a section on the line 3—3 of Fig. 1; Fig. 4 is a section on the line 4—4 of Fig. 1.

The truck forming the subject matter of this application composes a platform 1 which, if desired, may be a piece of board. Casters 2 and 3 are secured to the under surface of the platform 1 and are mounted for swivel movement on vertical axes, the construction being, that the platform may be moved laterally as well as forwardly and backwardly. A cleat 4 is attached by securing elements 5 to the under surface of the platform 1, adjacent to the forward end of the platform, the function of the cleat being to prevent the platform from splitting at one end. The cleat 4 is located slightly in advance of the casters 3. To the upper surface of the platform 1, a cleat 6 is attached. The cleat 6 carries a pad 7. The cleat 6 exercises a double office. First, it aids in preventing the platform 1 from splitting and, secondly, taken with the pad 7, it forms an angle rest. A knee pad 8 extends transversely of the platform 1 and is provided at its ends with flexible tongues 9 attached by securing elements 10, such as tacks, to the edges of the platform 1. The knee pad 8 is not otherwise connected to the platform. A space 11 exists between the knee pad 8 and the ankle rest, a space 12 existing between the knee pad 8 and the forward end of the platform 1. Since a space is provided between the angle rest and the knee pad 8 the knee pad may be moved backwardly to accommodate persons having a short leg. Since there is a space 12 between the pad 8 and the forward end of the platform 1, the knee pad may be moved forwardly, to accommodate a long legged person. The knee pad 8 may be adjusted without difficulty, since its ends are connected, only by a few tacks or the like, shown at 10 to the edges of the platform 1. The space 12 in front of the knee pad 8 is adapted to receive a slop bucket, paint, a plane or other tools.

In practical operation, the workman places his knee on the pad 8, the ankle being supported on the rest 6—7, as indicated clearly in Fig. 3 on the drawings. The ankle rest is of such a height that, when the ankle of the operator is placed thereon, the toe of the operator's boot will touch the floor. Consequently, the operator can hold the platform against slipping rearwardly due to the thrust on the work: or, if desired, the workman may move the platform 1 about, by toe pressure exerted on the floor.

Having thus described the invention, what is claimed is:

1. A kneeling truck embodying a wheel mounted-platform; an ankle rest secured to one end of the platform; a knee pad spaced from the ankle rest and from the other end of the platform; and means for securing the knee pad adjustably to the platform.

2. A kneeling truck embodying a wheel-mounted platform; a cleat secured to one surface of the platform adjacent to one end of the platform; a second cleat secured to the opposite surface of the platform adjacent to the other end of the platform; a pad mounted on the second cleat and coöperating therewith to form an ankle rest; and a knee pad secured to the platform in advance of the ankle rest.

3. A kneeling truck embodying a wheel-mounted platform; an ankle rest secured to one end of the platform; and a knee pad of less height than the ankle rest, the knee pad being secured to the platform in advance of the ankle rest, the ankle rest being of such height as to permit the toe of the operator to come into contact with the floor whereon the platform is mounted.

In testimony that I claim the foregoing as my own, I have hereto affixed my signature in the presence of two witnesses.

THOMAS G. ASHBRIDGE.

Witnesses:
 THEO H. M'CALLA,
 THOMAS M'CALLA.